(12) United States Patent
Nagano et al.

(10) Patent No.: US 7,616,879 B2
(45) Date of Patent: Nov. 10, 2009

(54) OPTICAL APPARATUS AND IMAGE-TAKING SYSTEM

(75) Inventors: Akihiko Nagano, Ichihara (JP); Makoto Takamiya, Tokyo (JP); Koichi Washisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 218 days.

(21) Appl. No.: 11/244,509

(22) Filed: Oct. 5, 2005

(65) Prior Publication Data
US 2006/0120710 A1 Jun. 8, 2006

(30) Foreign Application Priority Data
Oct. 6, 2004 (JP) ............................. 2004-294182

(51) Int. Cl.
G02B 7/28 (2006.01)
(52) U.S. Cl. ..................... 396/111; 359/625; 359/837
(58) Field of Classification Search ............... 396/111; 359/625, 837
See application file for complete search history.

(56) References Cited

U.S. PATENT DOCUMENTS

| | | | |
|---|---|---|---|
| 4,223,998 A | 9/1980 | Heinzl | |
| 4,408,853 A | 10/1983 | Tokutomi et al. | |
| 4,632,532 A | 12/1986 | Matsumura et al. | |
| 4,733,065 A * | 3/1988 | Hoshi et al. | 250/206.2 |
| 4,885,734 A | 12/1989 | Yuzo | |
| 4,952,816 A * | 8/1990 | Dunning | 250/559.31 |
| 5,168,141 A | 12/1992 | Tashjian et al. | |
| 5,485,209 A * | 1/1996 | Muramoto et al. | 348/349 |
| 5,716,122 A * | 2/1998 | Esaki et al. | 353/33 |
| 6,108,435 A * | 8/2000 | Mori et al. | 382/106 |
| 6,501,540 B2 * | 12/2002 | Shirai et al. | 356/5.1 |
| 6,671,031 B1 * | 12/2003 | Nishimura | 349/201 |
| 6,768,540 B2 * | 7/2004 | Kanemitsu | 356/3.14 |
| 6,933,978 B1 * | 8/2005 | Suda | 348/345 |
| 6,972,797 B2 * | 12/2005 | Izumi | 348/348 |
| 2002/0025155 A1 * | 2/2002 | Uchiyama et al. | 396/111 |
| 2004/0042780 A1 | 3/2004 | Kindaichi et al. | |

(Continued)

FOREIGN PATENT DOCUMENTS

EP 0 253 403 1/1988

(Continued)

OTHER PUBLICATIONS

Communication from the EPO dated Feb. 16, 2006 and Partial European Search Report dated Feb. 3, 2006.

(Continued)

*Primary Examiner*—WB Perkey
*Assistant Examiner*—Linda B Smith
(74) *Attorney, Agent, or Firm*—Cowan, Liebowitz & Latman, P.C.

(57) ABSTRACT

There is provided an optical apparatus that provides quick and precise TTL phase difference detection and pupil slicing focus detection. An optical apparatus includes a first optical element for splitting a first polarized light component contained in light that passes an exit pupil of a first optical system and directs to a photoelectric conversion element so that the first polarized light component direct to different light-receiving areas on the photoelectric conversion element. The optical apparatus may further include a second optical element for separating a second polarized light component contained in the light from said first optical element, from the first polarized light component.

9 Claims, 6 Drawing Sheets

U.S. PATENT DOCUMENTS

2005/0285967 A1 * 12/2005 Suda .................... 348/345

FOREIGN PATENT DOCUMENTS

| EP | 0 846 972 | | 6/1998 |
|---|---|---|---|
| EP | 1806604 | A1 * | 7/2007 |
| JP | 59-162515 | | 9/1984 |
| JP | 4-147207 | | 5/1992 |
| JP | 04-151628 | | 5/1992 |
| JP | 9-43507 | | 2/1997 |
| JP | 2004-46132 | | 2/2004 |
| WO | WO89/04007 | | 5/1989 |
| WO | 92/21046 | | 11/1992 |

OTHER PUBLICATIONS

Korean Office Action issued Oct. 17, 2006 for Korean patent application No. 10-2005-0093736. (with English abstract).
Extended European Search Report including Rule 44a EPO and the European Search opinion dated May 25, 2006.
English translation of a Chinese Office Action dated May 23, 2008 for a counterpart application No. 2005101051891.1.
Chinese Office Action dated May 23, 2008 for a counterpart application No. 2005101051891.1.
A Communication from the European Patent Office for Application No. 05256256.8 -2217 dated Mar. 4, 2009.

* cited by examiner

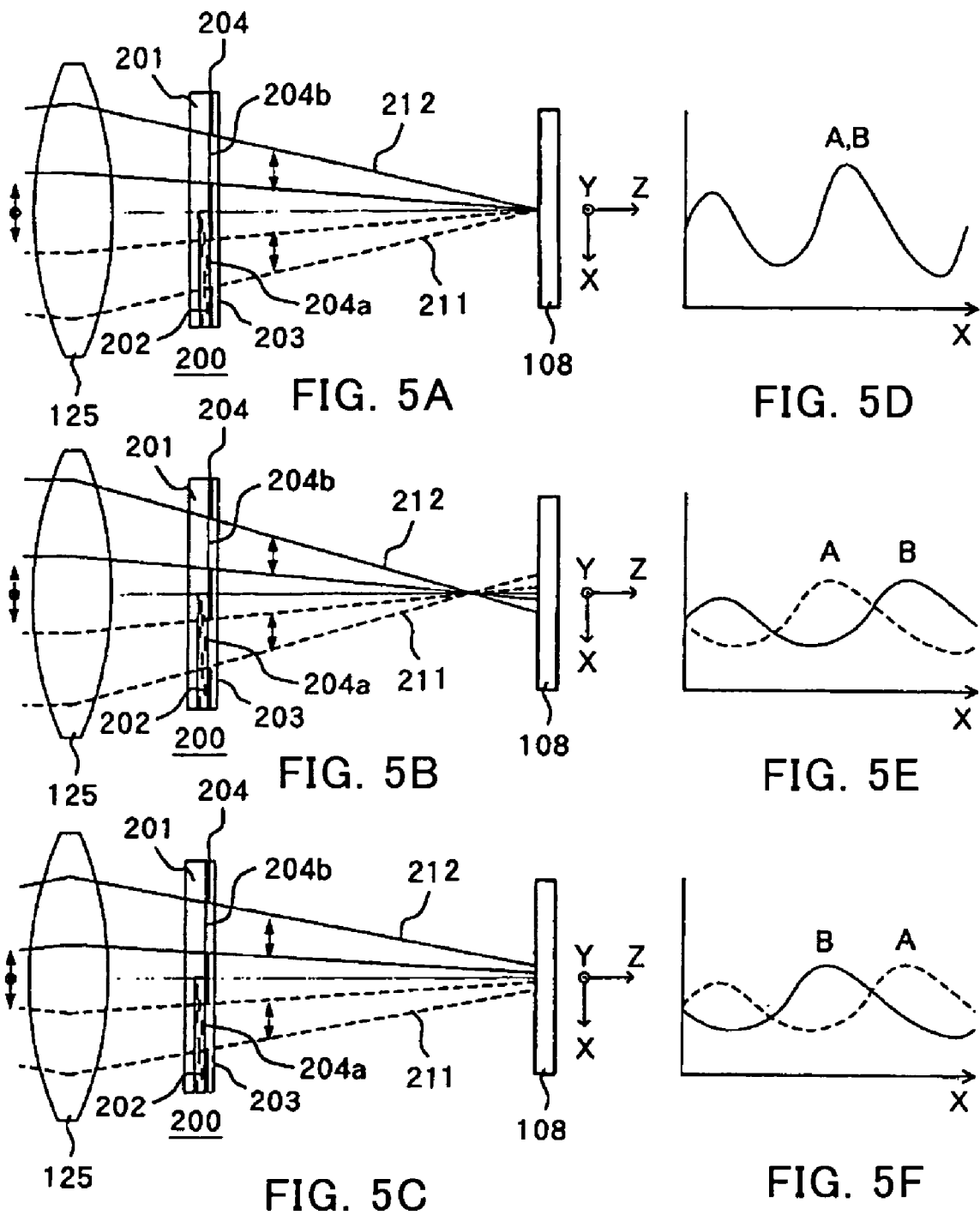

OPTICAL APPARATUS AND IMAGE-TAKING SYSTEM

BACKGROUND OF THE INVENTION

The present invention relates to an optical apparatus having an autofocus ("AF") control using a photoelectric conversion element ("PCE").

A single lens reflex type digital still camera or digital single lens reflex ("DSLR") camera adopts the so-called pupil slicing focus detection for precise focusing upon a quickly moving subject.

FIG. 7 shows a schematic structure of a conventional DSLR camera system. When a photographer observes a subject through an eyepiece 104, part of light 110 from the subject that transmits an image-taking lens 120 is reflected on a main mirror 101 and forms a subject image on a focusing glass 102 in a camera body 100. The subject image formed on the focusing glass 102 is guided to the photographer's eye via a penta prism 103 and the eyepiece 104.

Part of the light 110 from the subject passes through the main mirror 101, and is reflected on a sub-mirror 105 and guided to a focus detection unit 106. The focus detection unit 106 includes a field lens, a mirror, a stop mask, a secondary imaging lens, and a light-receiving sensor. The light-receiving sensor receives the light that passes different pupil areas on the image-taking lens 120, and an image signal is output from each of a pair of or plural pairs of line sensors in the light-receiving sensor. A focusing state (such as a defocus direction and a defocus amount) of the image-taking lens 120 can be detected based on a phase difference of this image signal. In addition, a driving direction and driving amount of a focus lens 123 in the image-taking lens 120 are calculated from the detected focusing state, and focus is obtained by driving the focus lens 123.

In the image-taking time, both the main mirror 101 and sub-mirror 105 retreat from the optical path and the light from the subject which has passed the image-taking lens 120 is guided to the image sensor 108.

The pupil slicing focus detection method of a through the taking lens ("TTL") phase difference detection ("PDD") requires a sensor dedicated for a focus detection and a secondary imaging optical system, and thus has difficulties in reducing a size and cost of the camera.

Accordingly, a digital still camera has recently been proposed which utilizes a subject taking image sensor for the TTL PDD and pupil slicing focus detection. For example, Japanese Patent Application, Publication No. ("JP") 9-43507 inserts, near a pupil of the image-taking lens, a mask that transmits the light from part of the pupil, and detects focus using a signal from the image sensor corresponding to two images by switching an opening position of the mask. Another focus detection system, proposed in JP 2004-46132, uses part of the image sensor as an AF sensor area, and guides to the area two lights split by a split image prism provided in the imaging optical system.

JP 4-147207 discloses another structure for the TTL PDD AF by arranging a holographic optical element closer to the object side.

However, the focus detection method proposed in JP 9-43507 changes the mask opening position, reads twice an image of the light that passes different pupil areas in the image-taking lens as an output (image signal) of the image sensor, compares these image signals. It takes a relatively long time to switch the mask opening position and to read two image signals from the image sensor. This focus detection method is rather unsuitable for a quickly moving subject.

A method that uses a split image prism proposed in JP 2004-46132 needs a larger image than the split image prism, different from the TTL PDD. In addition, unless an image on the boundary of the split image prism has a linear shape, this method determines that it is defocused even if it is focused. Therefore, this method has a limited focus detection capability or is inferior to the TTL PDD.

A method that uses the holographic optical element proposed in JP 4-147207 is similar to the TTL PDD in principle, but the holographic optical element possesses large color dispersion that causes an image to contain aberration in forming two AF images in the pupil slicing direction, which are important to a determination of the focusing state. Thus, this method is not practicable for the focus detection.

BRIEF SUMMARY OF THE INVENTION

Accordingly, it is an exemplary object of the present invention to provide an optical apparatus that provides quick and precise TTL PDD and pupil slicing focus detection.

An optical apparatus according to one aspect of the present invention includes a first optical element for splitting a first polarized light component contained in light that passes an exit pupil of a first optical system and directs to a photoelectric conversion element so that the first polarized light component direct to different light-receiving areas on the photoelectric conversion element. The optical apparatus may further include a second optical element for separating a second polarized light component contained in the light from said first optical element, from the first polarized light component.

An image-taking system according to another aspect of the present invention includes a lens unit that includes a first optical system, and the above optical apparatus that serves as an image-taking apparatus, onto which said lens unit is mounted.

Other objects and further features of the present invention will become readily apparent from the following description of the preferred embodiments with reference to the accompanying drawings.

BRIEF DESCRIPTION OF THE DRAWINGS

FIG. 5 is an explanatory view showing a focus detection principle according to the first embodiment.

DETAILED DESCRIPTION OF THE PREFERRED EMBODIMENTS

Referring now to the accompanying drawings, a description will be given of a preferred embodiment of the present invention.

First Embodiment

Figure 1:
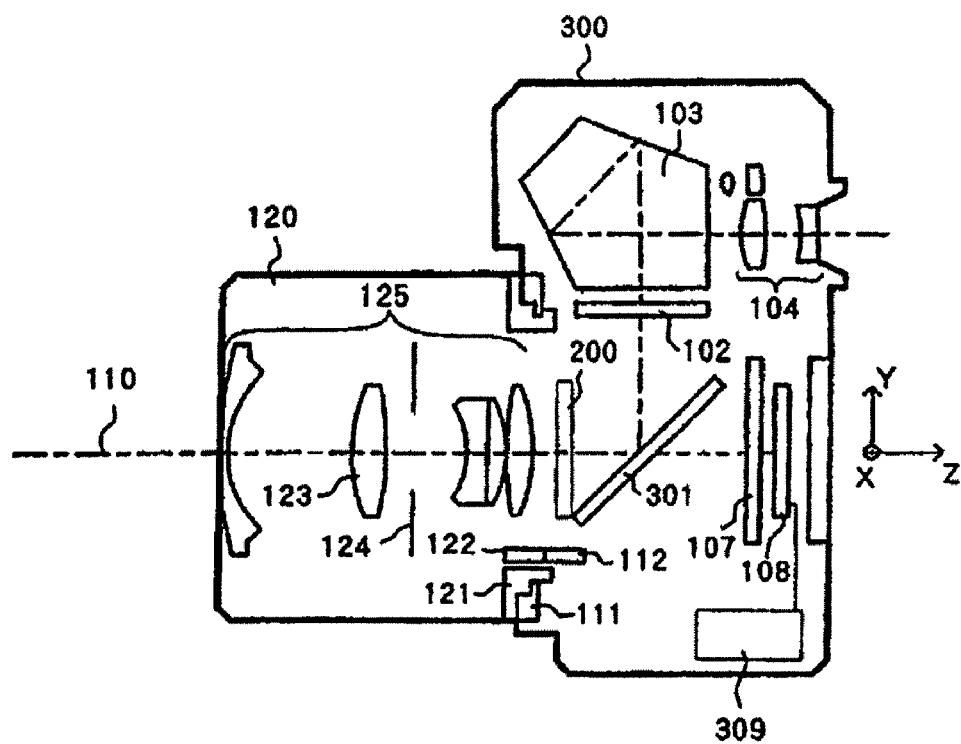
FIG. 1 is a schematic view of a structure of a camera system according to a first embodiment of the present invention.
Figure 7:
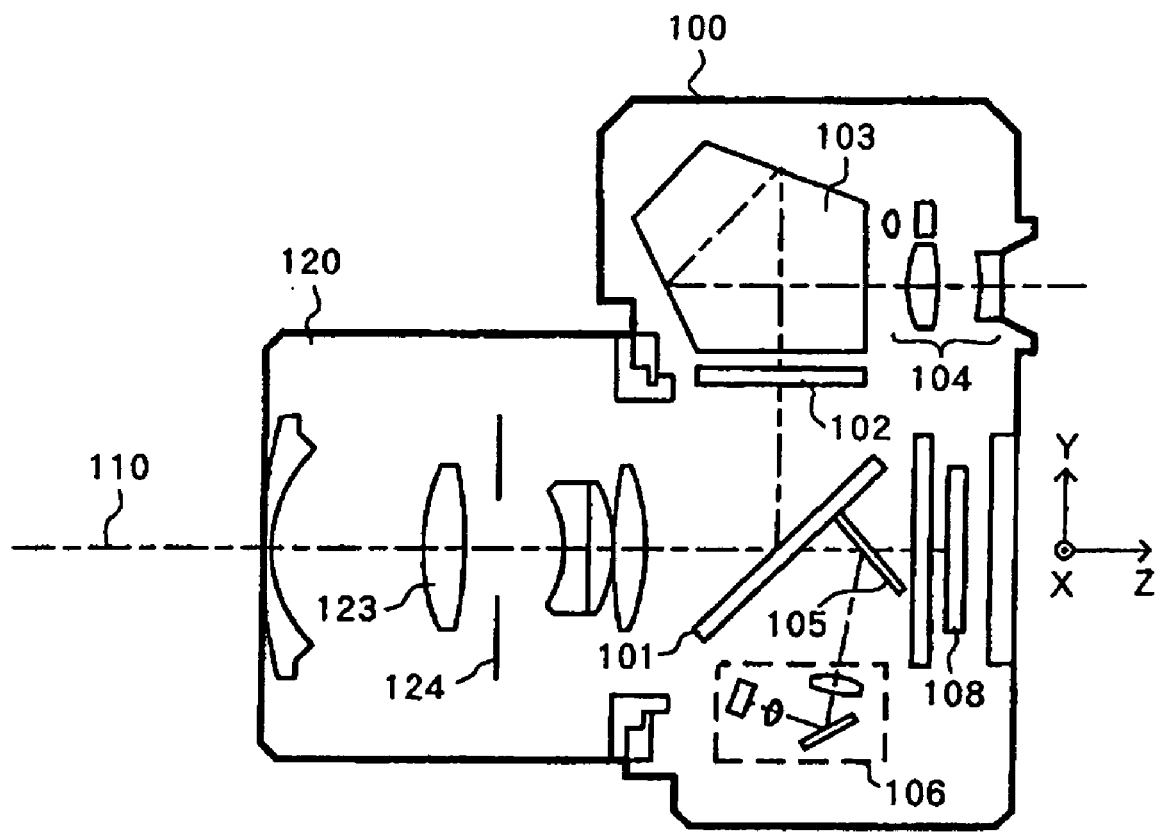
FIG. 7 is a schematic view of a structure of a conventional camera system.

FIG. 1 shows a schematic structure of a DSLR camera system according to an embodiment of the present invention. Those elements in FIG. 1, which are the corresponding elements in FIG. 7, are designated by the same reference numerals.

300 denotes a camera body (optical apparatus), onto which an image-taking or interchangeable lens 120 is mounted via a lens mount 121.

The image-taking lens 120 includes an image-taking optical system 125, and a lens controller, such as a MPU (not shown) etc. The image-taking optical system 125 serves as a first optical system that includes plural lenses including a focus lens 123 and a stop 124. The lens controller can communicate with a camera controller 309, such as an MPU, provided in the camera body 300, via a lens-side contact 122 and a camera-side contact 112. The camera controller 309 has an image processing function that generates a subject image based on a signal from an image-pickup device 108, which will be described later, and a focus detection function that detects a focusing state of the imaging-taking optical system 125 based on the signal from the image-pickup device 108, and operates a driving amount of the focus lens 123.

In the camera body 300, 200 denotes an optical deflector element that serves as a first optical element, and its concrete structure will be described later. 108 denotes an image-pickup device (or an image sensor) that serves as a PCE, such as a CCD sensor and a CMOS sensor. A polarization beam splitter ("PBS") 301 that serves as a second optical element is provided between the optical deflector element 200 and the image-pickup device 108. An infrared extinction and low-pass filter 107 is provided just prior to the image-taking element 108.

102 denotes a focusing glass. 103 denotes a penta prism that introduces a subject image formed on the focusing glass 102 to the eyepiece 104. The focusing glass 102, the penta prism 103 and the eyepiece 104 form a finder optical system that serves as a second optical system.

Figure 2:
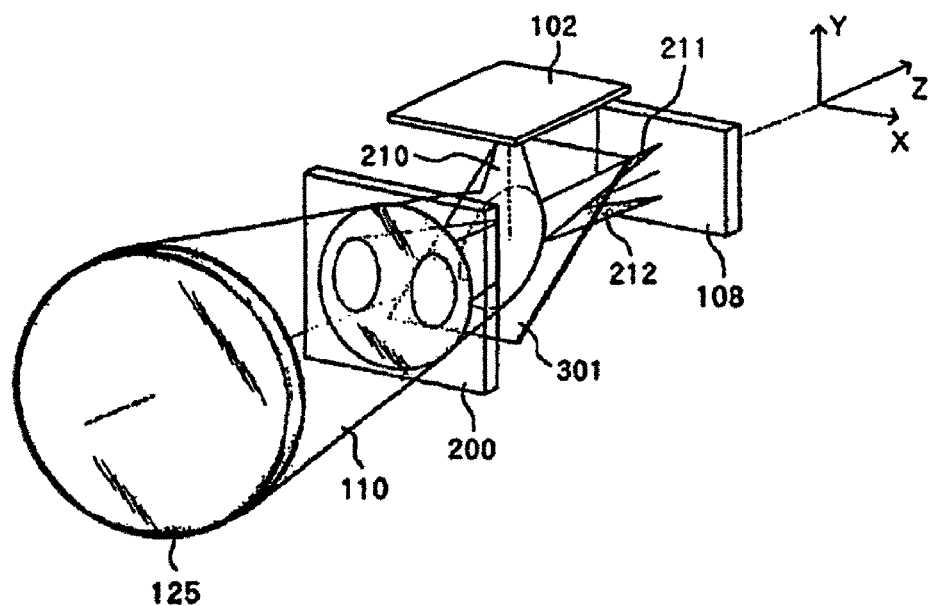
FIG. 2 is a schematic view of an optical path according to the first embodiment.

FIG. 2 denotes an optical path in detecting the focusing state of the image-taking optical system 125 or at the focus detection time in the above camera system.

The light 110 from the subject passes the image-taking optical system 125, and is incident upon the optical deflector element 200. This light 110 is a non-polarized light. The optical deflector element 200 deflects and transmits, in the +y direction part, (referred to as "plus deflected light" hereinafter) 200 of a first polarized light component that has a polarization plane parallel to the zx plane among the light 110. The PBS 301 serves to transmit the first polarized light component and reflect a second polarized light component having a polarization plane orthogonal to the zx plane for (or parallel to the yz plane).

Consequently, the plus deflected light 211 of the first polarized light component passes through the PBS 301, and condenses in an upper light-receiving area of the image-pickup device 108 in FIG. 2. Part (referred to as "minus deflected light" hereinafter) 212 of the first polarized light component is deflected in the −y direction, passes through the PBS 301, and condenses in a lower light-receiving area of the image-pickup device 108 in FIG. 2.

The plus and minus deflected lights 211 and 212 among the first polarized light component which have reached the image-pickup device 108 are lights that have passed different areas of the exit pupil of the image-taking optical system 125. Therefore, the plus and minus deflected lights 211 and 212 form a pair of images on the image-pickup device 108, providing the pupil slicing focus detection based on the output or image signals from the image-pickup device 108 corresponding to the pair.

On the other hand, the second polarized light component 210 contained in the light 110 travels straight and passes the optical deflector 200, is reflected on the PBS 301 as the second optical element, and condenses on the focusing glass 102, forming the subject image. Thereby, even in detecting focus using the first polarized light component including the plus and minus deflected lights 211 and 212, a photographer can observe the subject image via the finder optical system.

Figure 3A:
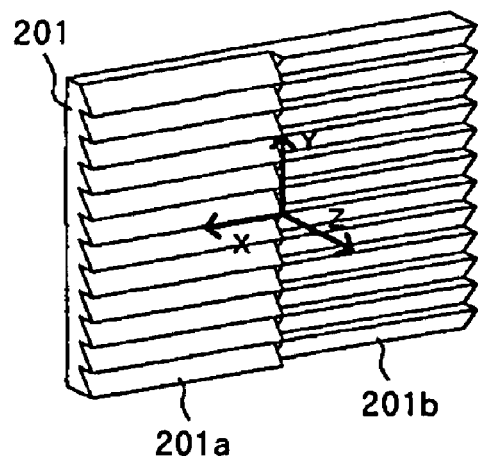
FIGS. 3A to 3D are views for explaining a structure and manufacturing method of an optical deflector element according to the first embodiment.
Figure 3B:
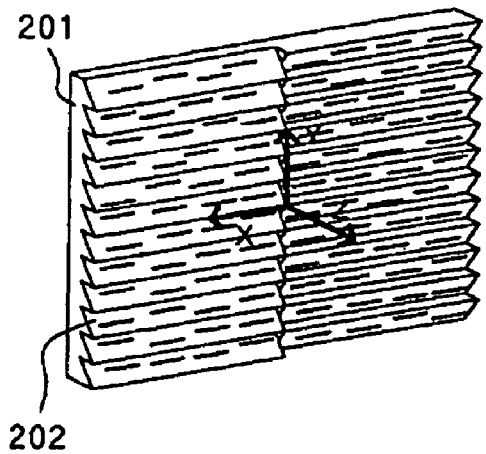
Figure 3C:
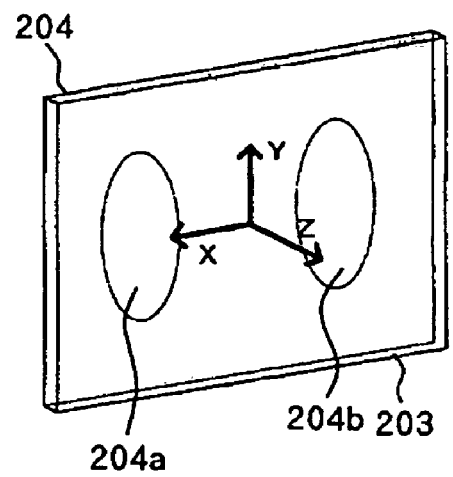
Figure 3D:
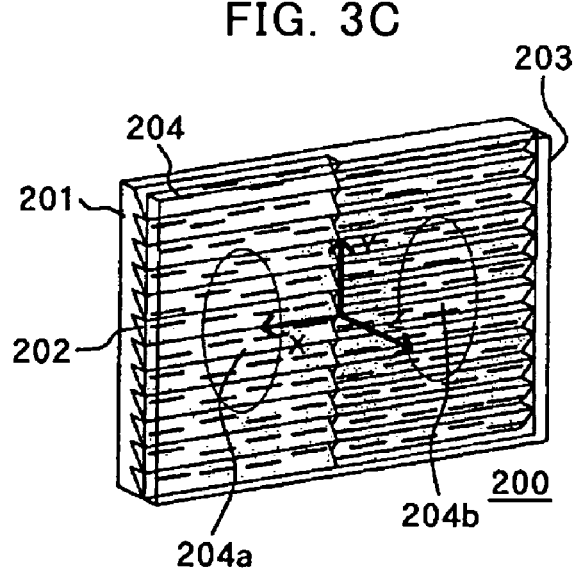

Referring now to FIGS. 3A to 3D, a description will be given of a structure and manufacture method of the optical deflector element 200. The optical deflector element 200 includes in order from a light incident side, as shown in FIG. 3D, a resin substrate 201 having a blazed diffraction grating, liquid crystal 202 filled in the grooves or concaves of the diffraction grating, a polarization film 204 having a pair of openings 204a and 204b as shown in FIG. 3C, and a glass substrate 203 adhered to the polarization film 204.

The resin substrate 201 includes, as shown in FIG. 3A, first and second diffraction gratings 201a and 201b having different blazed directions from each other, and these blazed diffraction gratings 201a and 201b are manufactured by a molding method that uses the resin substrate 201 and a mold.

The uniaxial light-transmitting liquid crystal 202 is filled, as shown in FIG. 3B, in the grating grooves of each of both the diffraction gratings 201a and 201b in the resin substrate 201. The material of the liquid crystal 202 is selected so that the ordinary index "no" of the liquid crystal 202 is approximately equal to the refractive index "ng" of the resin substrate 201.

The diffraction gratings 201a and 201b are oriented by applying an orientation film made of polyimide, etc. onto the surfaces of the diffraction gratings 201a and 201b. Next, the liquid crystal 202 is cured by irradiating the ultraviolet ("UV") light, after the solvent is vaporized by filling and heating the UV curing liquid crystal 202 in the grating grooves. The molecular axis of the liquid crystal polymer orientates approximately parallel to the grating groove direction (or x direction) of each of the diffraction gratings 201a and 201b. FIG. 3B shows a molecular axis of the liquid crystal polymer in a stick shape. The molecular axis direction of the liquid crystal polymer approximately accords with the optical-axis direction relative to the polarized light.

The glass substrate 203 pasted with the polarization film 204 is adhered to the side of the liquid crystal 202 of the resin substrate 201 in which the liquid crystal 202 is filled and cured in the grating grooves. The openings 204a and 204b in the polarization film 204 are arranged in areas corresponding to the diffraction gratings 201a and 201b. The openings 204a and 204b are arranged symmetrical with respect to the yz plane including the optical axis (or z axis). The polarization film 204 is arranged so that its polarization or optical axis is approximately orthogonal to the optical-axis direction of the liquid crystal 202 filled in the grating grooves.

Figure 4A:
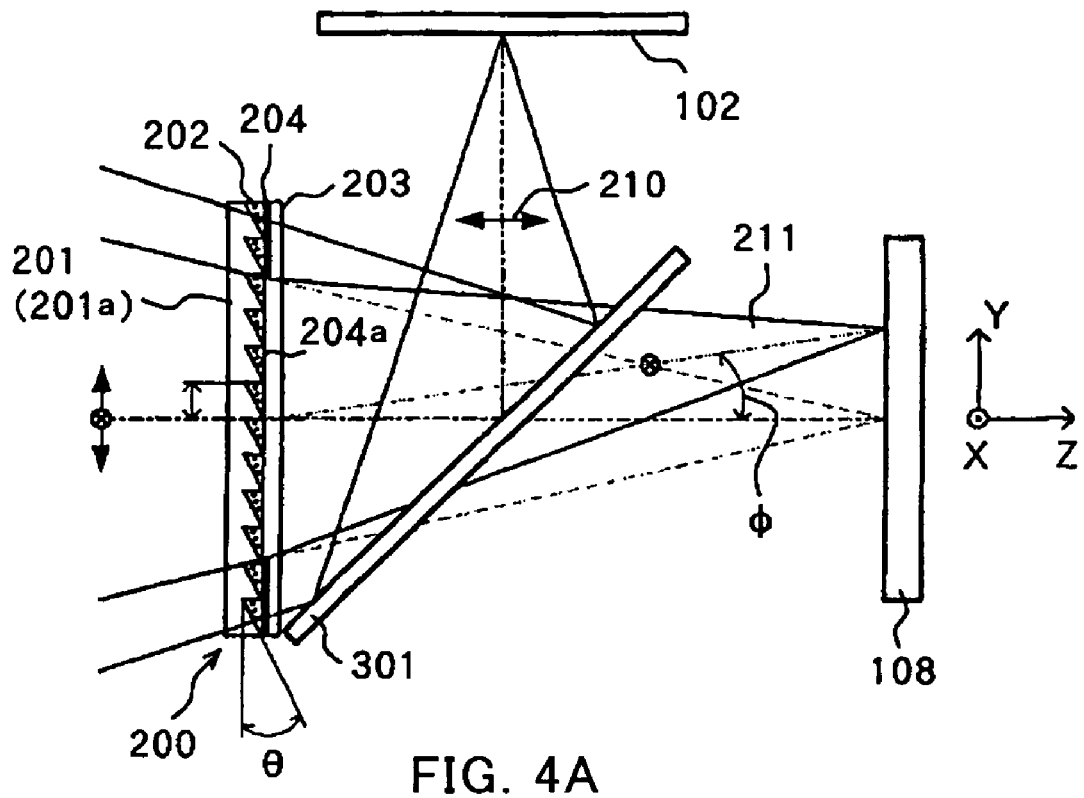
FIGS. 4A and 4B are schematic views of optical paths for a focus detection and for finder observation according to the first embodiment.
Figure 4B:
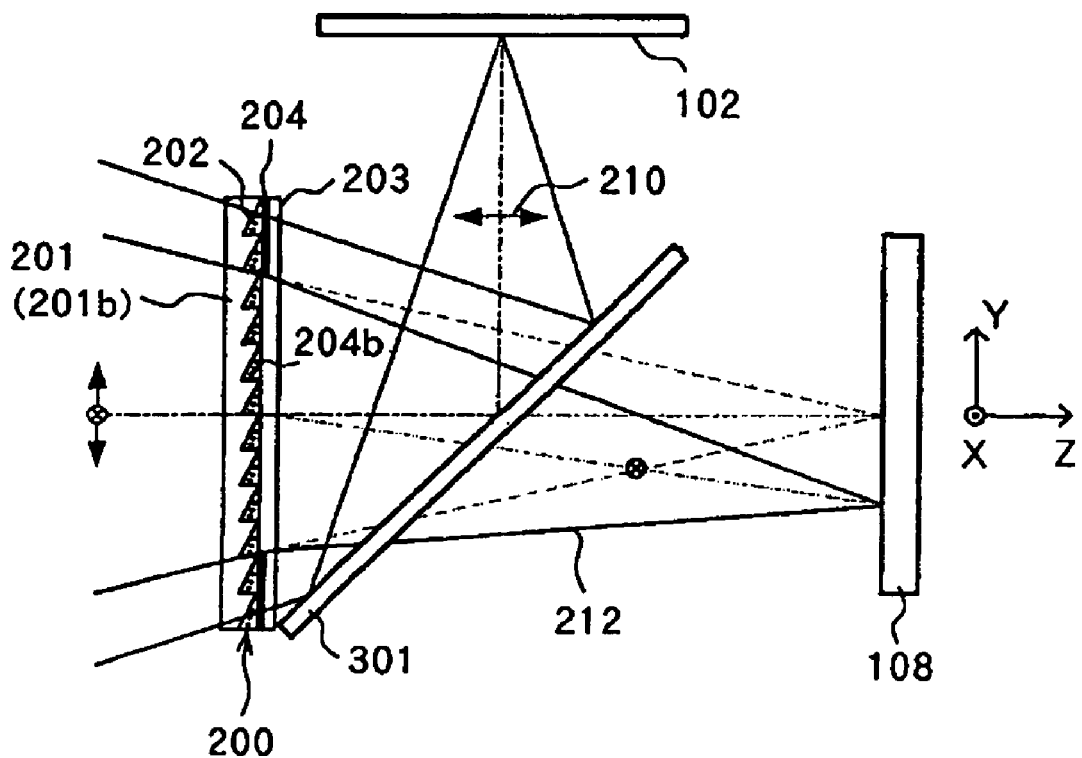

Referring now to FIGS. 4A and 4B, a description will be given of the pupil slicing focus detection while the finder optical system observes the subject image.

FIGS. 4A and 4B show a separation of the second polarized light component 210 used for the finder observation from the first polarized light component (plus deflected light 211 and minus deflected light 212) used for the focus detection.

FIG. 4A shows an optical path of a plane orthogonal to the zx plane that passes the center of the opening 204a in the polarization film 204 provided in the optical deflector element 200. The opening 204a in the polarization film 204 transmits a part (or first area) of the exit pupil in the image-taking optical system 125, and receives the light that has passed the diffraction grating 201a, i.e., the first and second polarized light components. The polarization axis direction of the polarization film 204 is set so that it absorbs the first polarized light component having the polarization plane parallel to the zx plane.

The molecular axis of the liquid crystal 202 filled in the grating grooves in the diffraction grating 201a orientates approximately parallel to the grating groove direction or the x direction. An extraordinary index "ne" of the liquid crystal 202 and the refractive index "ng" of the resin substrate 201 have the following relationship:

$$ne > ng \tag{1}$$

The first polarized light component having the polarization plane approximately parallel to the molecular axis of the liquid crystal 202 is deflected in the +y direction as illustrated. Part of the first polarized light component that has transmitted the liquid crystal 202 is absorbed in the polarization film 204, but the plus deflected light 211 of the first polarized light component that has passed the opening 204a in the polarization film 204 and the glass substrate 203 transmits the PBS 301 and reaches the upper light-receiving area in the image-pickup device 108 as illustrated.

For example, when the resin substrate 201 has a refractive index ng of 1.5, the liquid crystal 202 has an extraordinary index ne of 1.7, and a necessary deflecting angle Φ is 8° for the plus deflected light 211, a desired deflecting angle Φ is obtained by setting the grating pitch p of each of the diffraction gratings 201a and 201b to 4 μm, and an inclination angle θ of the resin substrate 201 to 35°.

FIG. 4B shows an optical path of a plane orthogonal to the zx plane that passes the center of the opening 204b in the polarization film 204 provided in the optical deflector element 200. The opening 204b in the polarization film 204 receives the light that has passed another part (or second area) of the exit pupil in the image-taking optical system 125, i.e., the first and second polarized light components.

The molecular axis of the liquid crystal 202 filled in the grating grooves in the diffraction grating 201b orientates approximately parallel to the grating groove direction or the x direction, and the refractive index ng of the resin substrate 201 and the extraordinary index ne of the liquid crystal 202 have the above relationship defined in Equation (1). Therefore, the first polarized light component having the polarization plane (parallel to the zx plane) approximately parallel to the molecular axis of the liquid crystal 202 is deflected in the −y direction in FIG. 4A. Part of the first polarized light that transmits the liquid crystal 202 is absorbed in the polarized film 204, but the minus deflected light 212 of the first polarized light component that has passed the opening 204b in the polarization film 204 and the glass substrate 203 transmits the PBS 301 and reaches the lower light-receiving area in the image-pickup device 108 as illustrated.

The ordinary index "no" of the liquid crystal 202 and the refractive index "ng" of the resin substrate 201 have the following relationship:

$$no \approx ng \tag{2}$$

Therefore, the second polarized light component 210 having the polarization plane (parallel to the yz plane) orthogonal to the molecular axis of the liquid crystal 202 travels straight without being subject to the deflections by the diffraction gratings 201a and 201b. The first polarized light component 210 is reflected by the PBS 301, condenses on the focusing glass 102, and forms the subject image. A photographer observes the subject image formed on the focusing glass 102 via the penta prism 103 and the eyepiece 104.

Referring now to FIGS. 5A and 5B, a description will be given of a focus detection principle using the plus and minus deflected lights 211 and 212. FIG. 5A shows an optical path when the image-taking optical system 125 is focused on a predetermined subject. Among the first polarized light component having a polarization plane parallel to the zx plane in FIG. 5A out of the light that passes the image-taking optical system 125 and enters the optical deflector element 200, the plus and minus deflected lights 211 and 212 that have passed the openings 204a and 204b in the polarization film 204 transmit the PBS 301, which is omitted in FIG. 5A, and image on the image-pickup device 108. FIG. 5D shows image signals from predetermined two lines extending in the x direction in the image-pickup device 108, which correspond to two images formed by the plus and minus deflected lights 211 and 212.

Although the plus and minus deflected lights 211 and 212 pass different areas on the exit pupil in the image-taking optical system 125, an image (signal) A formed by the plus deflected light 211 that passes the opening 204a accords in the x direction on the image-pickup device 108 with an image (signal) B formed by the minus deflected light 212 that passes the opening 204b, because the image-taking optical system 125 is focused on the subject.

FIG. 5B shows an optical path when the image-taking optical system 125 is in the front focus state to the subject or focused on a position before the subject. The plus and minus deflected lights 211 and 212 once image before the image-pickup device 108, diverge, and reach the image-pickup device 108. FIG. 5E shows an image signal from the above two lines corresponding to two images formed by the plus and minus deflected lights 211 and 212.

Since the image-taking optical system 125 is in the front focus state, the image (signal) A formed by the plus deflected light 211 that passes the opening 204a shifts from in the −x direction on the image-pickup device 108 with the image (signal) B formed by the minus deflected light 212 that passes the opening 204b. Thus, the camera controller 309 shown in FIG. 1 detects a defocus amount and a defocus direction (or front focus direction) of the image-taking optical system 125 based on the shifting direction and a positional relationship (or phase difference) between the images A and B.

FIG. 5C shows an optical path when the image-taking optical system 125 is in the so-called back focus state to the subject or focused on a position after the subject. The plus and minus deflected lights 211 and 212 divergently enter the image-pickup device 108. FIG. 5F shows an image signal from the above two lines corresponding to two images formed by the plus and minus deflected lights 211 and 212.

Since the image-taking optical system 125 is in the back focus state, the image (signal) A formed by the plus deflected light 211 that passes the opening 204a shifts from in the +x direction on the image-pickup device 108 with the image (signal) B formed by the minus deflected light 212 that passes the opening 204b. Thus, the camera controller 309 shown in FIG. 1 detects a defocus amount and a defocus direction (or front focus direction) of the image-taking optical system 125 based on the shifting direction and a positional relationship (or phase difference) between the images A and B.

Based on the detected defocus direction and defocus amount, the camera controller 309 operates a driving direction and a driving amount necessary for focusing of the focus lens 123 shown in FIG. 1, and controls driving of the focus lens 123 via the lens controller (not shown).

The optical deflector element 200 of this embodiment that has a polarization characteristic is affected by the subject when the subject has a polarization characteristic, the optical deflector element 200 is affected. In order to cancel the polarization characteristic of the subject, it is preferable to provide a ½ wave plate at an incident side of the optical deflector element 200, and to rotate the polarization direction or the polarization plane of the incident light upon the optical deflector element 200 if necessity arises.

After all of the finder observation, the focus detection, and the AF control are thus completed, the optical deflector 200 and the PBS 301 are retreated from the optical path between the image-taking optical system 125 and the image-pickup device 108 in photographing the subject with the image-pickup device 108.

As discussed above, this embodiment detects focus using the image-pickup device while confirming the subject through the finder optical system, and dispenses with the sensor and optical system dedicated for detecting the focus, promoting the miniaturization and cost reduction of the camera.

In addition, since two lights deflected by the optical deflector element form two images on the image-pickup device, a single readout of an image signal from the image-pickup device provides focus detection, maintaining the precision of the focus detection even to a quickly moving the subject.

Moreover, since the optical deflector element deflects, in different directions, the lights that enter different pupil areas on the image-taking optical system, this embodiment can provide pupil slicing and TTL PDD focus detection based on the image formed by each defected light.

The optical deflector element is configured to split and deflect the first polarized light component to form the focus detection images while transmitting the second polarized light component. Thus, the second polarized light component forms a non-distorted finder image.

The second polarized light component that transmits the optical deflector, is reflected on the PBS, and forms the finder image prevents drop of the light intensity of the finder image.

The configuration that allows the PBS and the optical deflector element to retreat from the optical path between the image-taking optical system and the image-pickup device eliminates from a shot subject image distortion or lowered light intensity caused by the PBS and optical deflector element.

The optical deflector element includes the first and second blazed diffraction gratings having different blaze directions, uniaxial light-transmitting material member, and polarization film, and provides an inexpensive optical element used for the pupil slicing focus detection.

Second Embodiment

Figure 6:
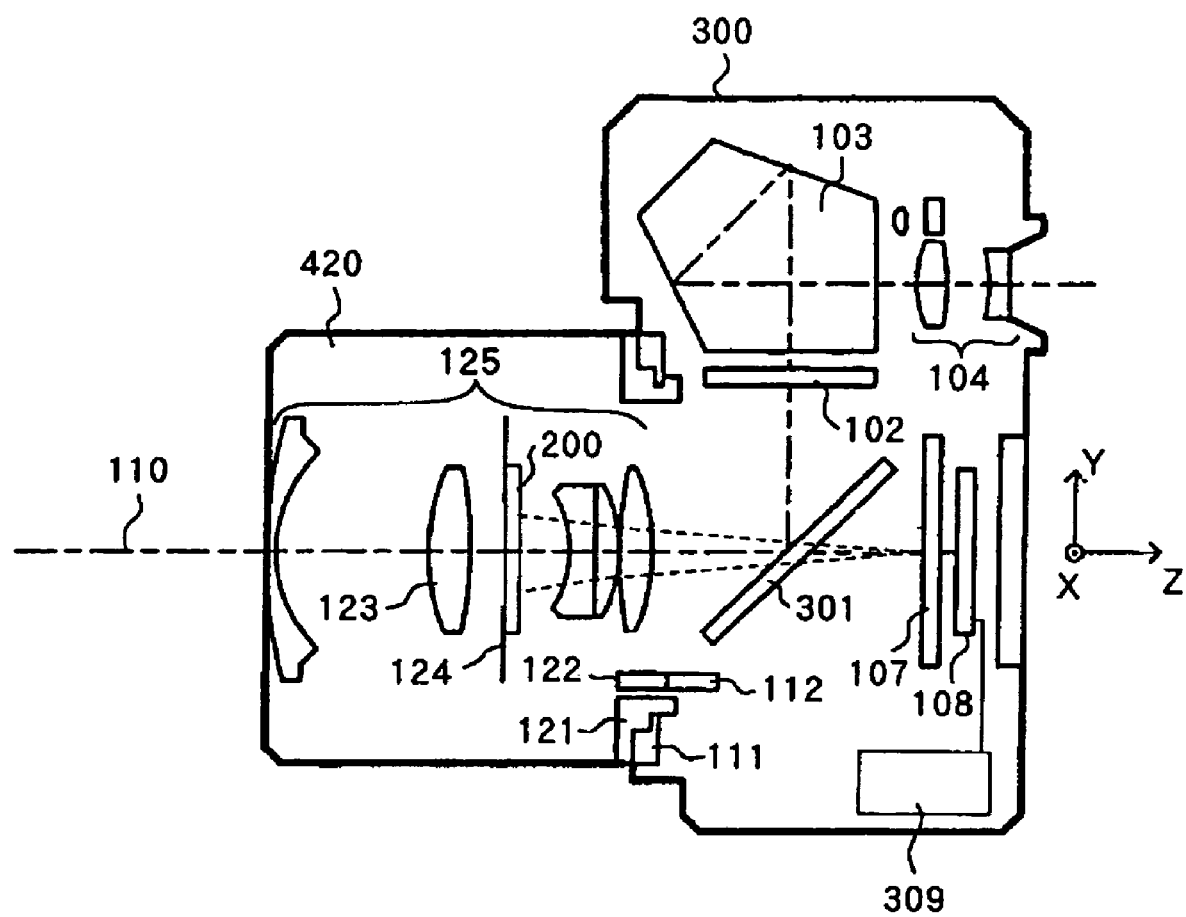
FIG. 6 is a schematic view of a structure of a camera system according to a second embodiment of the present invention.

While the first embodiment discusses the camera body that includes both the optical deflector element 200 and the PBS 301, the optical deflector element 200 may be provided at or near the pupil position (a position of the stop 124) in the image-taking or interchangeable lens 420 as shown in FIG. 6.

While the first and second embodiments discuss an interchangeable lens SLR camera system, the present invention is applicable to other camera systems, such as an integrated lens camera system.

While the above embodiments discuss the optical deflector element 200 that deflects the minus part in the +y direction and minus part in the −y direction among the first polarized light component, the present invention may deflect only one of parts and introduce the other to the image-pickup device 108 without deflecting the other. In this case, a pair of images are formed, for example, at the top and center of the image-pickup device.

While the above embodiments discuss deflections of the plus and minus deflected lights 211 and 212 in the same direction as the slicing direction in the pupil area in the image-taking optical system which these lights pass, a deflecting direction of each deflected light is not limited to these embodiments.

While the above embodiments discuss two images formed on the image-pickup device 108 using two deflected lights 211 and 212, the number of deflected lights and deflecting directions may increase so as to form four or more images.

While the above embodiments discuss use of the optical deflector element 200 having a pair of blazed diffraction gratings, another element that serves to deflect the light and generate less aberration may form the optical deflector element, in addition to the blazed diffraction grating. While the above embodiments discuss the optical deflector element that includes the liquid crystal filled in the grating grooves in the diffraction grating, the inventive arrangement between the diffraction grating and the liquid crystal is not limited to these embodiments. For example, a member that encloses the liquid crystal between glass substrates may be arranged adjacent to the diffraction grating (or resin substrate).

While the above embodiments discuss the optical deflector element 200 that splits part of the incident light using the polarization characteristic and forms two images on the image-pickup device 108, the inventive first optical element may use an optical deflector element that splits part of the incident light by using an optical characteristic, such as a wavelength characteristic, other than the polarization characteristic.

As discussed, the above embodiments split the first polarized light component incident upon the first optical element, and form a pair of images on the PCE, more quickly providing an image signal than switching the mask opening position. In addition, a pair of images have less aberration suitable for the focus detection than the split image prism and the holographic optical element. Thus, a fast and highly precise, TTL PDD and pupil slicing focus detection is available.

A separation of a second light component, such as the second polarized light component, contained in the light from a first optical element, from a first light component, such as the first polarized light component, directing to the PCE, only a pair of images can be formed on the PCE while the second light component can be used for other applications, such as a finder observation.

This application claims foreign priority benefits based on Japanese Patent Application No. 2004-294182, filed on Oct. 6, 2004, which is hereby incorporated by reference herein in its entirety as if fully set forth herein.

What is claimed is:

1. An optical apparatus having an auto-focus function through a pupil slicing focus detection by a through the taking lens phase difference detection comprising:
   an optical deflector for splitting an image light of an object that passes an exit pupil of an image-taking optical system into a first polarized light component and a second polarized light component and for deflecting two luminous fluxes comprising of the first polarized light component with respect to the other in a deflection direction;
   a photoelectric conversion element for receiving the image light from the optical deflector so that at least two images are formed on different areas of the photoelectric conversion element;
   a focusing glass;

a polarization beam splitter for reflecting the second polarized light component to the focusing glass and for transmitting the first polarized light component to the photoelectric conversion element; and a detector for detecting a phase difference of the at least two images formed on different areas of the photoelectric conversion element thereby detecting a focusing state of the image-taking optical system, wherein the photoelectric conversion element is an image-pickup device configured to photograph the image light of the object formed by the image-taking optical system and to generate an output signal for the detector.

2. An optical apparatus according to claim 1, wherein said optical deflector includes: plural diffraction gratings having blazing shapes and different blaze directions; and an uniaxial light-transmitting material member having a specific optical-axis direction.

3. An optical apparatus according to claim 2, wherein said optical deflector has a polarization film having a polarization axis direction approximately orthogonal to an optical-axis direction of the uniaxial light-transmitting material, and plural opening areas.

4. An optical apparatus according to claim 1, wherein said optical deflector directs the first polarized light component that passes a first area in the exit pupil to a first light-receiving area on the photoelectric conversion element, and the first polarized light component that passes a second area in the exit pupil to a second light-receiving area on the photoelectric conversion element.

5. An optical apparatus according to claim 1, wherein a focus detection device that detects a focusing state of the image-taking optical system based on outputs from the different light-receiving areas.

6. An optical apparatus according to claim 1, further comprising a second optical element for separating a second polarized light component contained in the light from said optical deflector, from the first polarized light component.

7. An optical apparatus according to claim 6, wherein said second optical element introduces the second polarized light component to a second optical system.

8. An optical apparatus according to claim 6, wherein the optical deflector and second optical element are movable across an optical path from the image-taking optical system to the photoelectric conversion element.

9. An image-taking system comprising: a lens unit that includes a first optical system; and an optical apparatus according to claim 1 that serves as an image-taking apparatus, onto which said lens unit is mounted.

* * * * *